United States Patent [19]
Bottum

[11] 4,185,615
[45] Jan. 29, 1980

[54] SOLAR COLLECTOR STRUCTURE

[76] Inventor: Edward W. Bottum, 9357 Spencer Rd., Brighton, Mich. 48116

[21] Appl. No.: 840,775

[22] Filed: Oct. 11, 1977

[51] Int. Cl.² .................................................. F24J 3/02
[52] U.S. Cl. .................................................. 126/424
[58] Field of Search ................................ 126/270, 271

[56] References Cited
U.S. PATENT DOCUMENTS

| 3,982,526 | 9/1976 | Barak | 126/270 |
| 4,038,972 | 8/1977 | Orrison | 126/271 |
| 4,089,323 | 5/1978 | Trihey | 126/271 |

Primary Examiner—Carroll B. Dority, Jr.
Attorney, Agent, or Firm—Whittemore, Hulbert & Belknap

[57] ABSTRACT

The solar collector structure includes a solar collector for deriving heat from the sun for useful heating purposes. The collector structure is pivotally mounted and means are provided to pivot the structure during daylight hours to follow the sun and receive the maximum amount of heat available. The means for pivoting the solar structure includes bellows which are expanded and contracted in accordance with the angle at which the solar structure is positioned with respect to the sun.

6 Claims, 3 Drawing Figures

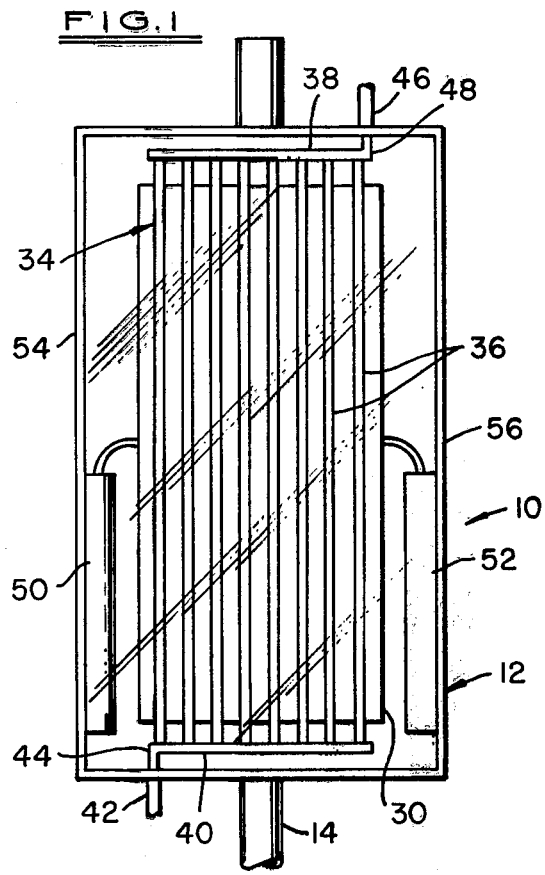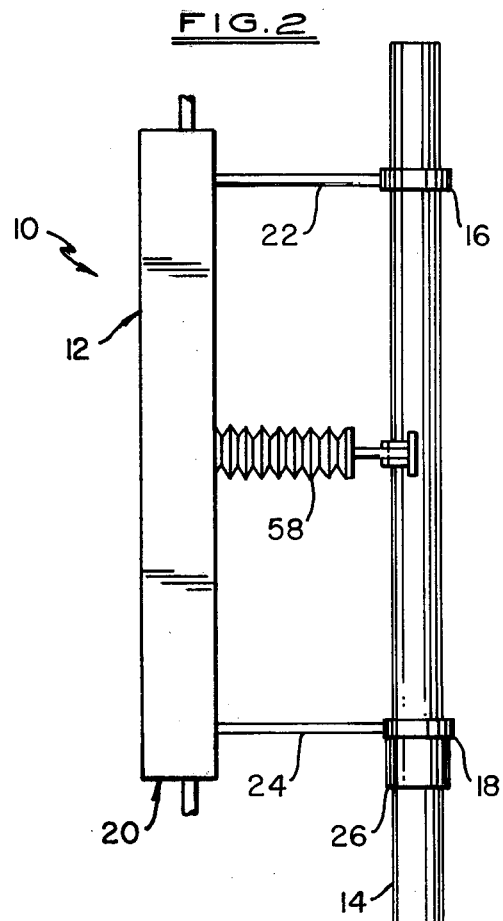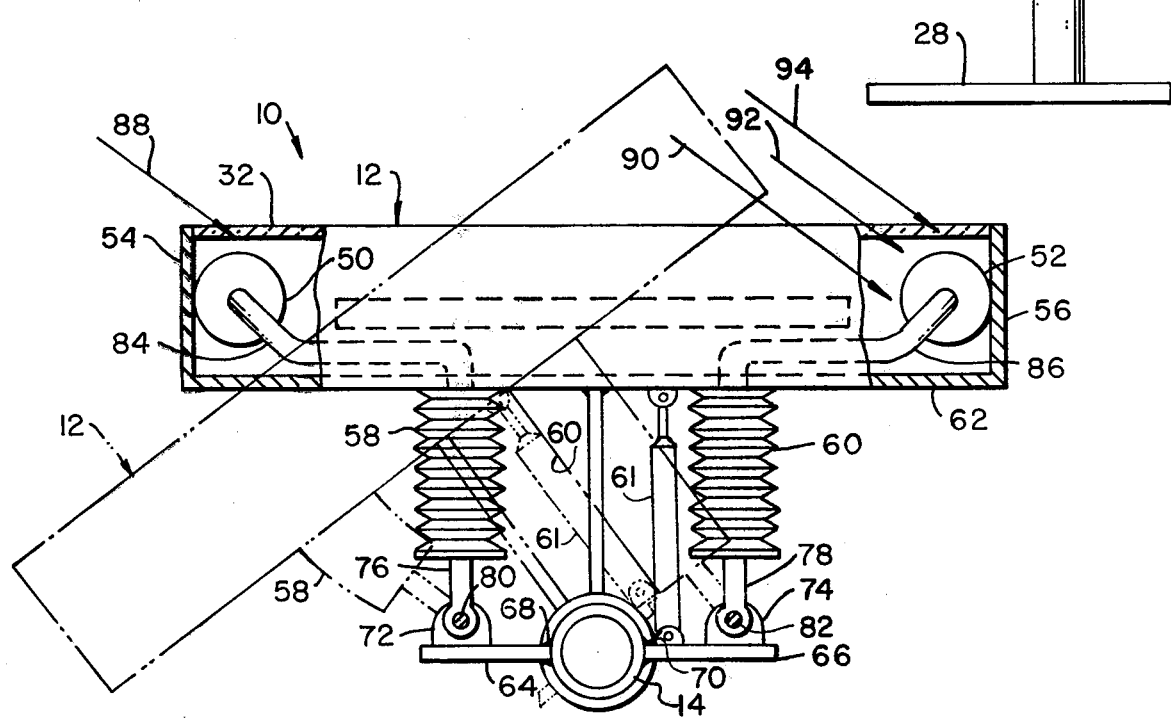

SOLAR COLLECTOR STRUCTURE

BACKGROUND OF THE INVENTION

Various systems for collecting and utilizing solar energy for heating purposes have been proposed in the past. Generally, in such systems, solar collector devices have been strategically placed in outdoor areas to receive sun rays. Fluids are passed through the solar collectors and absorb heat from such collectors. Such fluids are moved from the solar collector to a point where the heat which is collected from the sun is ultimately utilized for heating purposes.

It is desirable that the solar collectors be positioned as nearly as possible to receive sun rays directly. One technique which has been utilized in the past is to fixedly position the solar collectors so that the collector will receive an optimum amount of sun rays during the course of a day. Such fixed installations inherently result in a compromise situation wherein the sun rays do not directly impinge against the collector during some period of the day, usually in the morning and evening.

Systems have been proposed wherein the solar collector is rotated during the day to follow the path of the sun. In such systems, electric motors have usually been used as the means for rotating the collector. Electric motors have the disadvantage of being relatively high in cost, require the consumption of electrical energy during use, and necessitate maintenance and repair costs. A system has also been proposed wherein heated fluid in canisters is moved from one side of the collector to another to cause a weight imbalance, causing movement of the collector.

The present invention proposes means for pivoting a solar collector which involve vaporizaton of refrigerant to operate a bellows construction. The system is inherently economical in design and effective in use. The number of operative parts is minimal, thereby reducing the need and cost of maintenance and repair.

SUMMARY OF THE INVENTION

The solar collector structure comprises a solar collector which includes a tubular structure for the passage of fluid therethrough for the purpose of heating the same. Fixed means pivotally mount the collector for angular movement to position the collector during the course of a day to directly face the sun. A container is positioned on each side of the vertical center of the tubular structure. Shading means are provided on the collector for each of the containers. The shading means for each container block sun rays from impinging on surface portions of the container located on the side thereof opposite the vertical center of the tubular structure. A bellows is positioned on each side of the vertical center of the tubular structure. The bellows are connected between the tubular structure and the fixed means. Conduit means are connected between the interior of each container and the interior of the adjacent bellows. A charge of a volatile fluid is provided in each of the containers. The fluid in each container vaporizes when heated by the sun, resulting in pressurizing the connected bellows and tending to cause the bellows to expand with resultant pivoting of the solar collector.

IN THE DRAWING:

FIG. 1 is a front elevational view of the solar collector structure illustrating one embodiment in accordance with the present invention;

FIG. 2 is a side elevational view of the solar collector structure of FIG. 1; and FIG. 3 is a top plan view of the solar collector structure of FIG. 1, with portions broken away for the purpose of clarity.

Referring to FIG. 1, the solar collector structure 10 includes a solar collector 12 which is pivotally mounted on an upright post 14 by means of upper and lower rings 16, 18 which are connected to solar collector casing 20 by means of support elements 22, 24. A collar 26 is fixedly secured to a lower portion of the post 14. Lower ring 18 rests on the collar 26 to thereby support the solar collector 12 in the position illustrated. The post 14 is supported by means of a base 28 which may be firmly secured to the ground.

Any of a variety of commercially available solar collectors may be used in connection with the present invention. Such solar collectors may be used individually, as illustrated, or may be connected in banks. The illustrated solar collector comprises a box-like casing 20 in which is mounted a metallic plate 30. The plate 30 is normally blackened to result in maxium absorption of heat. A transparent plate 32 is placed on the front of casing 20. Sun rays readily pass through plate 32 to heat the collector structure. However, plate 32 tends to prevent reverse movement of heat.

A tubular structure 34 is secured on the face of plate 30 in heat transfer relation thereto. The structure 34 comprises a plurality of parallel tubes 36 connected at each end by tubular manifolds 38, 40. Conduit 42 is connected to inlet 44 and conduit 46 is connected to outlet 48.

As is common, relatively cool fluid passes into lower manifold 40 via inlet 44. This fluid passes through tubes 36 and thence into manifold 38 and exits via outlet 48. The conduits 42, 46 are connected to a remote point wherein heat is extracted from the fluid which has been heated as a result of its passage through the collector. The fluid used for the system may be, for example, water or like fluids in which the sensible heat is extracted, or the fluid may be refrigerant which boils from a liquid to a vapor in the collector, the vapor subsequently being condensed to give up the latent heat.

A cylindrical container 50, 52 is mounted within casing 20, one on each side of the vertical center of tubular structure 34. One of the containers 50 is on one side of the plate 30 while the other container 52 is on the other side of the plate 30. Each of the containers 50, 52 is positioned so as to absorb sun rays. The containers are placed closely adjacent casing side walls 54, 56 so that generally the front portion and inside portions only of the containers may receive sun rays. The outer surface portions of the containers are shaded from the sun by means of the side walls 54, 56.

A pair of spaced apart bellows 58, 60 are connected to the exterior surface of the casing back wall 62. The bellows 58, 60 are spaced about an equal distance from the vertical center of the casing.

A pair of outwardly extending arms 64, 66 are secured to post 14 in alignment with the bellows 58, 60, as by welding at 68, 70. Each of the arms carries a bracket 72, 74. The outer ends of the bellows carry projecting elements 76, 78 which are pivotally secured to the brackets by means of pins 80, 82. The upper end of each of the containers 50, 52 is connected to the interior of bellows 58, 60 by means of conduits 84, 86. The containers 50, 52 are charged with a readily vaporizable refrigerant material, such as a fluorinated hydrocarbon or methylchloride.

A piston and cylinder type motion dampener 61 is pivotally connected between arm 66 and collector 12 to prevent fluttering in the wind.

In operation of the structure 10, as best seen in FIG. 3, when the sun is positioned to the left of the solar collector 12, the sun rays will assume the angle illustrated by arrows 88, 90, 92, 94. Illustratively, only one arrow 88 forming part of the potential amount of sunlight which could impinge on container 50 will actually impinge upon the container. The remaining potential sunlight will be absorbed by side wall 54. On the other hand, about three times as much sunlight, represented by arrows 90, 92, 94, will impinge upon container 52. This will result in container 52 becoming warmer than container 50. The refrigerant within container 52 will boil and a portion thereof will vaporize. The vaporized refrigerant will move, as a consequence of its own vapor pressures, into bellows 60. This will cause bellows 60 to expand. Some of the refrigerant in container 50 may also vaporize. However, the vapor pressure resulting in bellows 60 will be greater than in bellows 58, resulting in bellows 60 expanding while bellows 58 is forced to contract. This will cause the solar collector 12 to be pivoted to the dotted line position illustrated. In this position, the sun rays are more directly impinging upon the plate 30 and tubes 36, resulting in a more efficient collection of sun energy. Movement of the collector 12 will continue until the pressures in the containers equalizes.

As will be appreciated, as the sun moves, the angle of the sun rays will change. As this occurs, the amount of the rays impinging upon containers 50, 52 will change, resulting in variation of the vapor pressure in bellows 58, 60 in such a manner that the solar collector 12 will be constantly shifted in position to follow the sun as it passes from one position to another during the day. About a 120° pivot of the solar collector 12 appears to be satisfactory to accomodate the hours of sunlight during the period of a day.

The bellows 58, 60 are located above the containers 50, 52 so that when the refrigerant condenses from vapor to liquid in the bellows it will return to the containers by gravity.

Having thus described my invention, I claim:

1. A solar collector structure comprising a solar collector including a tubular structure for the passage of fluid therethrough for the purpose of heating the same, a box-like case including a back and at least two parallel vertically extending, spaced apart side walls extending perpendicularly to the back at each side thereof on each side of and in spaced relation to the tubular structure, a vertically extending cylindrical post adjacent to and in spaced relation to the case, means pivotally mounting the case on the post for pivotal movement about the vertical axis of the cylindrical post, a separate container positioned immediately adjacent each side wall of the case whereby the side walls of the case shade the containers from the sun's rays impinging on the case in accordance with the orientation of the case, fixed means secured to the post, bellows positioned between the case and the fixed means secured to the post on each side of the post, conduit means connected between the interior of each container and the interior of the bellows closest thereto, and a charge of volatile fluid in each of said containers, said fluid in each container vaporizing when heated by the sun resulting in pressurizing the connected bellows and tending to cause the bellows to expand and cause the solar collector to pivot about the vertical axis of the post whereby the front of the case will tend to point in the direction of the sun's rays.

2. A solar collector structure as defined in claim 1, further characterized in that the means for pivotally supporting the case from the post comprises separate rings sleeved over the post vertically spaced apart thereon, means securing the rings to the case, and a collar secured to the post immediately beneath at least one of the rings.

3. A solar collector structure as defined in claim 1, further characterized in that said bellows are each located above the respective connected container.

4. A solar collector structure as defined in claim 1 further characterized in that said bellows each are pivotally connected to said fixed means and fixedly connected to said solar collector.

5. A solar collector structure as defined in claim 1, further characterized in the provision of motion dampening means between the solar collector and said fixed means.

6. A solar collector structure as defined in claim 5 wherein the motion dampening means is piston and cylinder structure.

* * * * *